United States Patent
Ye

(10) Patent No.: US 10,558,110 B2
(45) Date of Patent: *Feb. 11, 2020

(54) GIMBAL HAVING PARALLEL STABILITY MECHANISM

(71) Applicant: SZ DJI OSMO TECHNOLOGY CO., LTD., Shenzhen (CN)

(72) Inventor: Fangming Ye, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,840

(22) Filed: Jul. 19, 2018

(65) Prior Publication Data

US 2018/0329281 A1    Nov. 15, 2018

Related U.S. Application Data

(63) Continuation of application No. 15/703,222, filed on Sep. 13, 2017, now Pat. No. 10,054,843, which is a
(Continued)

(51) Int. Cl.
*G03B 17/56* (2006.01)
*F16C 11/06* (2006.01)
(Continued)

(52) U.S. Cl.
CPC ............ *G03B 17/561* (2013.01); *B64D 47/08* (2013.01); *F16C 11/045* (2013.01); *F16C 11/06* (2013.01);
(Continued)

(58) Field of Classification Search
CPC .................................................. G03B 17/561
See application file for complete search history.

(56) References Cited

U.S. PATENT DOCUMENTS

| 4,282,529 A | 8/1981 | Speicher |
| 4,490,724 A | 12/1984 | Bickman |

(Continued)

FOREIGN PATENT DOCUMENTS

| CN | 101058186 A | 10/2007 |
| CN | 101116971 A | 2/2008 |

(Continued)

OTHER PUBLICATIONS

The World Intellectual Property Organization (WIPO) International Search Report and Written Opinion for PCT/CN2015/086992 dated Apr. 26, 2016 11 Pages.

*Primary Examiner* — Noam Reisner
(74) *Attorney, Agent, or Firm* — Anova Law Group, PLLC

(57) ABSTRACT

A gimbal mechanism includes a first actuator providing rotation about a first actuator axis, a second actuator providing rotation about a second actuator axis different from the first actuator axis, a first coupler operatively coupling the first actuator and a payload and being configured to affect rotation of the payload about the first actuator axis, and a second coupler operatively coupling the second actuator and the payload and being configured to affect rotation of the payload about the second actuator axis. The first actuator and the second actuator are fixed in position and orientation relative to one another and relative to a support structure. The support structure is configured to support at least one of the first actuator or the second actuator.

19 Claims, 8 Drawing Sheets

Related U.S. Application Data continuation of application No. 15/192,686, filed on Jun. 24, 2016, now Pat. No. 9,791,767, which is a continuation of application No. PCT/CN2015/086992, filed on Aug. 14, 2015.

(51) Int. Cl.

| | | |
|---|---|---|
| *F16M 13/02* | (2006.01) | |
| *F16M 11/08* | (2006.01) | |
| *F16M 11/10* | (2006.01) | |
| *F16M 11/18* | (2006.01) | |
| *F16C 11/04* | (2006.01) | |
| *B64D 47/08* | (2006.01) | |
| *F16M 11/20* | (2006.01) | |
| *B64C 39/02* | (2006.01) | |

(52) U.S. Cl.
CPC ........... *F16M 11/08* (2013.01); *F16M 11/105* (2013.01); *F16M 11/18* (2013.01); *F16M 11/2021* (2013.01); *F16M 11/2064* (2013.01); *F16M 13/02* (2013.01); *B64C 39/024* (2013.01); *B64C 2201/127* (2013.01); *F16C 2326/01* (2013.01)

(56) References Cited

U.S. PATENT DOCUMENTS

| | | |
|---|---|---|
| 4,855,838 A | 8/1989 | Jones et al. |
| 5,708,943 A | 1/1998 | Applegate et al. |
| 5,769,748 A | 6/1998 | Eyerly et al. |
| 5,797,054 A | 8/1998 | Aaddock et al. |
| 5,897,223 A | 4/1999 | Tritchew et al. |
| 5,966,991 A | 10/1999 | Gosselin et al. |
| 7,534,057 B2 | 5/2009 | Jones et al. |
| 7,561,784 B2 | 7/2009 | Wescott et al. |
| 7,905,463 B2 | 3/2011 | Burnham et al. |
| 8,882,369 B1 | 11/2014 | Nelson et al. |
| 2008/0316368 A1* | 12/2008 | Fritsch ............... H04N 5/23203 348/722 |
| 2009/0216394 A1 | 8/2009 | Heppe et al. |
| 2010/0320356 A1* | 12/2010 | Maillard ................ F16M 11/12 248/487 |
| 2014/0375745 A1 | 12/2014 | Hoels |
| 2015/0071627 A1 | 3/2015 | Hoang |

FOREIGN PATENT DOCUMENTS

| | | |
|---|---|---|
| CN | 101943312 A | 1/2011 |
| CN | 202295294 U | 7/2012 |
| CN | 103274064 A | 9/2013 |
| CN | 103624773 A | 3/2014 |
| CN | 203902844 U | 10/2014 |
| GB | 2464147 A | 4/2010 |
| JP | H0556310 A | 3/1993 |
| JP | 2012118145 A | 6/2012 |
| WO | 2014150063 A1 | 9/2014 |

\* cited by examiner

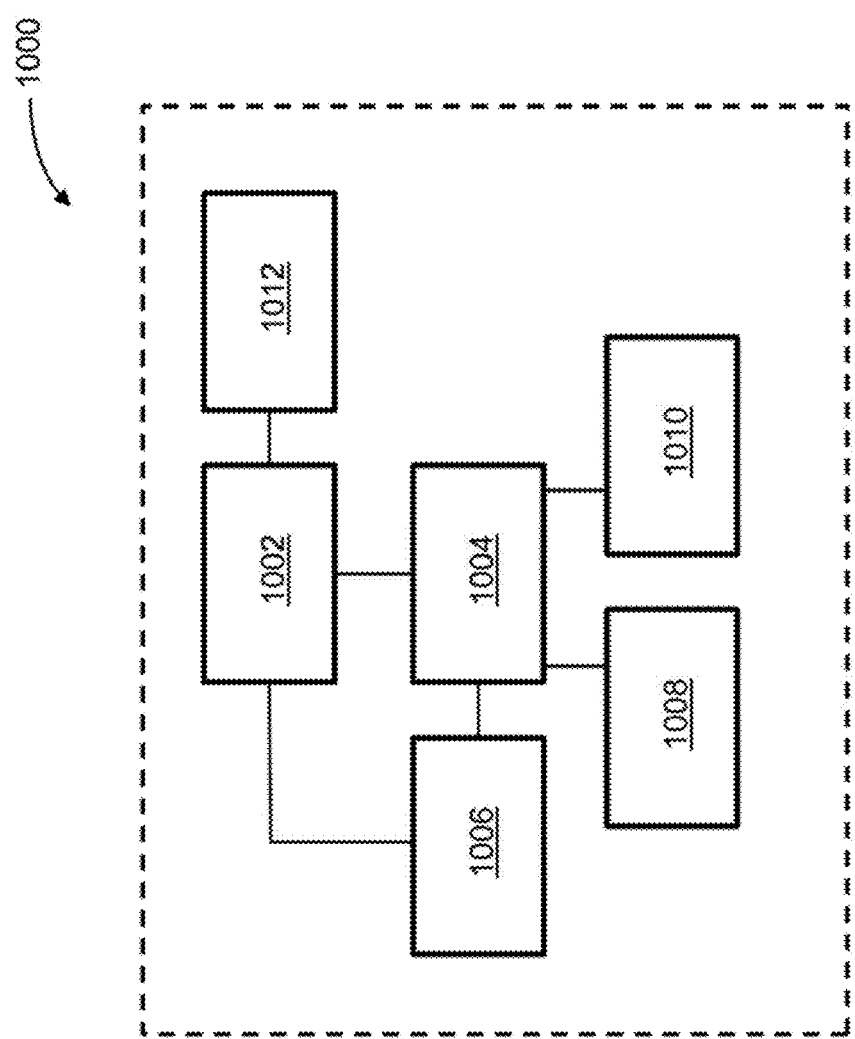

GIMBAL HAVING PARALLEL STABILITY MECHANISM

CROSS-REFERENCE

The present application is a continuation of U.S. application Ser. No. 15/703,222, filed on Sep. 13, 2017, which is a continuation of U.S. application Ser. No. 15/192,686, filed on Jun. 24, 2016, now U.S. Pat. No. 9,791,767, which is a continuation of International Application No. PCT/CN2015/086992, filed on Aug. 14, 2015, entitled "Gimbal Having Parallel Stability Mechanism," the entire contents of all of which are incorporated herein by reference.

BACKGROUND

Unmanned vehicles, such as ground vehicles, air vehicles, surface vehicles, underwater vehicles, and spacecraft, have been developed for a wide range of applications including surveillance, search and rescue operations, exploration, and other fields. In some instances, unmanned vehicles may be equipped with a payload configured to collect data during flight. For example, unmanned aerial vehicles (UAV) may be equipped with cameras for aerial photography. A payload may be coupled to an unmanned vehicle via a gimbal mechanism that provides movement of the payload in one or more degrees of freedom.

However, existing gimbal mechanisms for payloads coupled to unmanned vehicles can be less than ideal. In some instances, the gimbal mechanism may comprise a serial mechanism wherein a motor of one stage becomes of load of another succeeding stage, which may not be optimal for minimizing the volume and weight of the gimbal mechanism. In some instances, the gimbal mechanism may provide less than ideal stability to the payload.

SUMMARY

A need exists for improved gimbal mechanisms for supporting a payload, the improved gimbal mechanisms having reduced volume and weight while providing stability of movement to the payload. The present disclosure describes devices and methods for providing movement of a payload about at least two degrees of freedom. A gimbal mechanism as described herein can provide rotation of a payload about at least two different axes, wherein the rotation about the two axes is controlled by two actuators that can be actuated independently of one another. The two actuators can be fixed in position and orientation relative to one another, such that neither actuator is driven by the other. Therefore, the gimbal mechanism can control movement of the payload about two degrees of freedom in a parallel manner. The gimbal mechanisms described herein can have a compact configuration that allows for minimizing or reducing the volume and weight of the gimbal mechanisms, while improving the stability of movement provided by the gimbal mechanisms.

In one aspect of the present disclosure, a gimbal mechanism for providing movement of a payload about at least two degrees of freedom is described. The gimbal mechanisms comprises a first actuator providing rotation about a first actuator axis, and a second actuator providing rotation about a second actuator axis different from the first actuator axis. The gimbal mechanism further comprises a first coupler operatively coupling the first actuator and the payload, the first coupler configured to affect rotation of the payload about the first actuator axis. The gimbal mechanism further comprises a second coupler operatively coupling the second actuator and the payload, the second coupler configured to affect rotation of the payload about the second actuator axis. The first coupler is configured to allow free rotation of the payload about the second actuator axis, and the second coupler is configured to allow free rotation of the payload about the first actuator axis.

In another aspect of the present disclosure, a method for providing movement of a payload about at least two degrees of freedom is described. The method comprises providing a gimbal mechanism comprising a first actuator and a second actuator, wherein the first actuator is configured to provide rotation about a first actuator axis, and the second actuator is configured to provide rotation about a second actuator axis different from the first actuator axis. The method further comprises coupling the payload to a first coupler operatively coupled to the first actuator, the first coupler configured to affect rotation of the payload about the first actuator axis. The method further comprises coupling the payload to a second coupler operatively coupled to the second actuator, the second coupler configured to affect rotation of the payload about the second actuator axis. The method further comprises actuating one or more of the first actuator and the second actuator. The first coupler is configured to allow free rotation of the payload about the second actuator axis, and the second coupler is configured to allow free rotation of the payload about the first actuator axis.

In another aspect of the present disclosure, a gimbal mechanism for providing movement of a payload about at least two degrees of freedom is described. The gimbal mechanism comprises a first actuator providing rotation about a first actuator axis, and a second actuator providing rotation about a second actuator axis different from the first actuator axis. The gimbal mechanism further comprises a first coupler operatively coupling the first actuator and the payload, the first coupler configured to affect rotation of the payload about the first actuator axis. The gimbal mechanism further comprises a second coupler operatively coupling the second actuator and the payload, the second coupler configured to affect rotation of the payload about the second actuator axis. A position or orientation of the second actuator is independent of an actuation of the first actuator, and a position or orientation of the first actuator is independent of an actuation of the second actuator.

In another aspect of the present disclosure, a method for providing movement of a payload about at least two degrees of freedom is described. The method comprises providing a gimbal mechanism comprising a first actuator and a second actuator, wherein the first actuator is configured to provide rotation about a first actuator axis, and the second actuator is configured to provide rotation about a second actuator axis different from the first actuator axis. The method further comprises coupling the payload to a first coupler operatively coupled to the first actuator, the first coupler configured to affect rotation of the payload about the first actuator axis. The method further comprises coupling the payload to a second coupler operatively coupled to the second actuator, the second coupler configured to affect rotation of the payload about the second actuator axis. The method further comprises actuating one or more of the first actuator and the second actuator. A position or orientation of the second actuator is independent of an actuation of the first actuator, and a position or orientation of the first actuator is independent of an actuation of the second actuator.

In another aspect of the present disclosure, a gimbal mechanism for providing movement of a payload about at least two degrees of freedom is described. The gimbal mechanism comprises a first actuator providing rotation about a first actuator axis, and a second actuator providing rotation about a second actuator axis different from the first actuator axis. The gimbal mechanism further comprises a first coupler operatively coupling the first actuator and the payload, the first coupler configured to affect rotation of the payload about the first actuator axis. The gimbal mechanism further comprises a second coupler operatively coupling the second actuator and the payload, the second coupler configured to affect rotation of the payload about the second actuator axis. Both the first coupler and the second coupler are directly coupled to the payload.

In another aspect of the present disclosure, a method for providing movement of a payload about at least two degrees of freedom is described. The method comprises providing a gimbal mechanism comprising a first actuator and a second actuator, wherein the first actuator is configured to provide rotation about a first actuator axis, and the second actuator is configured to provide rotation about a second actuator axis different from the first actuator axis. The method further comprises coupling the payload to a first coupler operatively coupled to the first actuator, the first coupler configured to affect rotation of the payload about the first actuator axis. The method further comprises coupling the payload to a second coupler operatively coupled to the second actuator, the second coupler configured to affect rotation of the payload about the second actuator axis. The method further comprises actuating one or more of the first actuator and the second actuator. Both the first coupler and the second coupler are directly coupled to the payload.

In another aspect of the present disclosure, a gimbal mechanism for providing movement of a payload about at least two degrees of freedom is described. The gimbal mechanism comprises a first actuator providing rotation about a first actuator axis, and a second actuator providing rotation about a second actuator axis different from the first actuator axis. The gimbal mechanism further comprises a first coupler operatively coupling the first actuator and the payload, the first coupler configured to affect rotation of the payload about the first actuator axis. The gimbal mechanism further comprises a second coupler operatively coupling the second actuator and the payload, the second coupler configured to affect rotation of the payload about the second actuator axis. The first actuator and the second actuator are fixed in position and orientation (1) relative to one another, and (2) relative to a support structure configured to support at least one of the first actuator or the second actuator.

In another aspect of the present disclosure, a method for providing movement of a payload about at least two degrees of freedom is described. The method comprises providing a gimbal mechanism comprising a first actuator and a second actuator, wherein the first actuator is configured to provide rotation about a first actuator axis, and the second actuator is configured to provide rotation about a second actuator axis different from the first actuator axis. The method further comprises coupling the payload to a first coupler operatively coupled to the first actuator, the first coupler configured to affect rotation of the payload about the first actuator axis. The method further comprises coupling the payload to a second coupler operatively coupled to the second actuator, the second coupler configured to affect rotation of the payload about the second actuator axis. The method further comprises actuating one or more of the first actuator and the second actuator. The first actuator and the second actuator are fixed in position and orientation (1) relative to one another, and (2) relative to a support structure configured to support at least one of the first actuator or the second actuator.

In another aspect of the present disclosure, a gimbal mechanism for providing movement of a payload about at least two degrees of freedom is described. The gimbal mechanism comprises a first actuator providing rotation about a central actuator axis at a first actuator speed, and a second actuator co-axial with the first actuator, providing rotation about the central actuator axis at a second actuator speed. The gimbal mechanism further comprises a differential member comprising a differential gear operatively coupled to the first actuator and the second actuator, and a shaft extending between the first actuator and the second actuator, the shaft having a input end coupled to the differential gear and an output end coupled to the payload. The differential member is configured to rotate freely about a differential member axis, the differential member axis extending along a length of the shaft. The payload is configured to rotate about the central actuator axis, the differential member axis, or both, based on the first actuator speed and the second actuator speed.

In another aspect of the present disclosure, a method for providing movement of a payload about at least two degrees of freedom is described. The method comprises providing a gimbal mechanism comprising a first actuator, a second actuator, and a differential member, wherein the differential member comprises a differential gear operatively coupled to the first actuator and the second actuator, and a shaft extending between the first actuator and the second actuator, the shaft coupled to the differential gear at an input end. The method further comprises coupling the payload to an output end of the shaft, and actuating one or more of the first actuator and the second actuator. The first actuator and the second actuator are configured to provide rotation about a central actuator axis, and the differential member is configured to provide rotation about a differential member axis. The payload is configured to rotate about the central actuator axis, the differential member axis, or both, based on the first actuator speed and the second actuator speed.

In another aspect of the present disclosure, a gimbal mechanism for providing movement of a payload about at least two degrees of freedom is described. The gimbal mechanism comprises a first actuator providing rotation about a central actuator axis at a first actuator speed, and a second actuator co-axial with the first actuator, providing rotation about the central actuator axis at a second actuator speed. The gimbal mechanism further comprises a differential member comprising a differential gear operatively coupled to the first actuator and the second actuator, and a shaft having an input end coupled to the differential gear, and an output end coupled to the payload. The differential member is configured to rotate freely about a differential member axis, the differential member axis extending along a length of the shaft. The payload is configured to rotate about the central actuator axis, the differential member axis, or both, based on the first actuator speed and the second actuator speed. The gimbal mechanism is coupled to an aerial vehicle, and configured to provide a full rotation of the payload about the central actuator axis and a full rotation of the payload about the differential member axis.

In another aspect of the present disclosure, a method for providing movement of a payload about at least two degrees of freedom is described. The method comprises providing a gimbal mechanism comprising a first actuator, a second actuator, and a differential member, wherein the differential member comprises a differential gear operatively coupled to the first actuator and the second actuator, and a shaft coupled to the differential gear at an input end. The method further comprises coupling the payload to an output end of the shaft, and actuating one or more of the first actuator and the second actuator. The first actuator and the second actuator are configured to provide rotation about a central actuator axis, and the differential member is configured to provide rotation about a differential member axis. The payload is configured to rotate about the central actuator axis, the differential member axis, or both, based on the first actuator speed and the second actuator speed. The gimbal mechanism is coupled to an aerial vehicle, and configured to provide a full rotation of the payload about the central actuator axis and a full rotation of the payload about the differential member axis.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9 is a schematic illustration by way of block diagram of a system for controlling a movable object, in accordance with embodiments.

DETAILED DESCRIPTION

Figure 1:
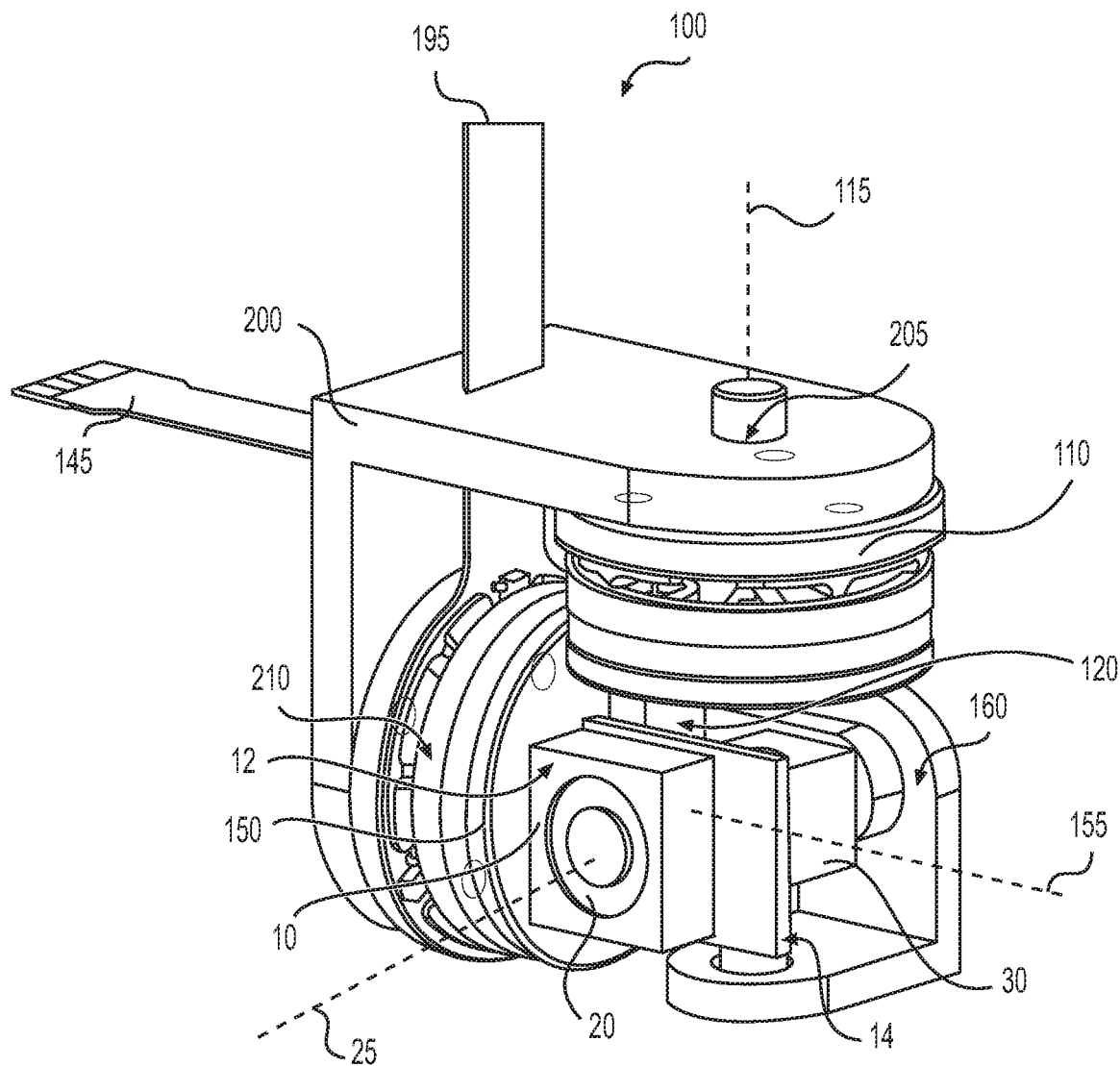
FIG. 1 illustrates an example of a gimbal mechanism for providing movement of a payload about two degrees of freedom, in accordance with embodiments.

Devices and methods described herein provide movement of a payload coupled to a carrier, about at least two degrees of freedom. The carrier may be a gimbal mechanism. Any description herein of a gimbal mechanism may relate to any type of carrier that may be used to support the payload, and which may provide movement of the payload relative to a support structure that is carrying the carrier. A gimbal mechanism as described herein can provide rotation of a payload about at least two different axes, wherein the rotation about the two axes is controlled by two actuators that can be actuated independently of one another. The two or more actuators can be fixed in position and orientation relative to one another, such that neither actuator is driven by the other. The gimbal mechanism may provide a rotation of a payload about multiple axes (e.g., two or more, three or more, four or more, five or more, etc.). For each axis, the gimbal mechanism may include a corresponding gimbal component that may include an actuator and/or frame component. Therefore, the gimbal mechanism can control movement of the payload about at least two degrees of freedom in a parallel manner. The gimbal mechanisms described herein can have a compact configuration that allows for minimizing or reduction of the volume and/or weight of the gimbal mechanisms, while improving the stability of movement provided by the gimbal mechanisms.

An aerial vehicle, such as an unmanned aerial vehicle (UAV), may be equipped with a payload, such as a camera for aerial photography. Such a payload can be supported with a structure, such as a gimbal mechanism, that provides for movement of the payload about one or more degrees of freedom. When the payload is coupled to a UAV, which is usually limited in volume and weight, the payload is preferably small and lightweight. Therefore, a gimbal mechanism to be coupled to a UAV for supporting a payload preferably has a minimal volume and weight, while providing stable motion of the payload about at least two degrees of freedom. This may allow the payload, such as a camera to capture views from many different positions and orientations.

Any description herein of a payload may apply to any type of payload, such as a camera, or vice versa. A payload may capture and/or sense information about the surrounding environment (e.g., sense visual information, thermal information, audio information, acoustic information, ultrasonic information, motion-related information, inertial information, magnetic information, electrical information, or communication information). The payload may optionally provide an emission, such as light, sound, vibrations, or any other type of emission. The payload may or may not ally the UAV to interact with the surrounding environment (e.g., robotic arm). Any description of a camera may apply to any image capturing device. The camera may be configured to capture dynamic (e.g., video) and/or still (e.g., snapshot) images.

The exemplary gimbal mechanisms described herein comprise at least two actuators or motors that do not drive each other, such that one motor does not become a load driven by the other motor. The motors may operate independently of one another. For instance, the two motors may control the attitude of the supported camera in a parallel manner, independently of each other. Therefore, the presently disclosed gimbal mechanisms can augment the stability of any two degrees of freedom such as yaw, roll, and/or pitch of the supported camera, while minimizing the weight of the motors and the volume of the gimbal mechanism.

Referring now to the drawings, FIG. 1 illustrates an example of a gimbal mechanism 100 for providing movement of a payload 10 about at least two degrees of freedom, in accordance with embodiments. The gimbal mechanism 100 comprises a first actuator 110 configured to provide rotation about a first actuator axis 115, and a second actuator 150 configured to provide rotation about a second actuator axis 155. The first actuator axis 115 can be different from the second actuator axis 155. For example, the first actuator axis and the second actuator axis can be positioned at any non-zero angle relative to one another, such as at a 90° angle as shown in FIG. 1. The first actuator axis and the second actuator axis may be at non-parallel angles relative to one another. They may be substantially orthogonal to one another. The first and second actuator axes may be stationary, relative to one another or relative to an environment. Alternatively, they may move, relative to an environment or relative to one another. In one example, a first actuator axis may be substantially vertical relative to an orientation of a UAV. A second actuator axis may be substantially horizontal relative to an orientation of the UAV.

The gimbal mechanism 100 further comprises a first coupler 120 operatively coupling the first actuator and the payload, and a second coupler 160 operatively coupling the second actuator and the payload. The first coupler may optionally directly contact the first actuator or may indirectly contact the payload through one or more intermediary structures. The intermediary structures may optionally be stationary relative to the first actuator. The first coupler may optionally directly contact the payload or may indirectly contact the payload through one or more intermediary structures. The intermediary structures may optionally be stationary relative to the payload. The second coupler may optionally directly contact the second actuator or may indirectly contact the payload through one or more intermediary structures. The intermediary structures may optionally be stationary relative to the second actuator. The second coupler may optionally directly contact the payload or may indirectly contact the payload through one or more intermediary structures. The intermediary structures may optionally be stationary relative to the payload. The first coupler and/or the second coupler may be formed from a single integral piece. Alternatively, the first coupler and/or second coupler may be each formed from multiple individual pieces. The multiple individual pieces may be stationary relative to one another. Alternatively, the multiple individual pieces may be movable relative to one another. The individual pieces may be movable relative to one another via rotation and/or displacement.

The first coupler can be configured to affect rotation of the payload about the first actuator axis, while the second coupler can be configured to affect rotation of the payload about the second actuator axis. Thus, the payload supported by the gimbal mechanism 100, such as a camera, can move about two degrees of freedom, one degree of freedom comprising rotation about the first actuator axis 115 and another degree of freedom comprising rotation about the second actuator axis 155. For example, for a payload comprising a camera in the orientation shown in FIG. 1, the gimbal mechanism 100 can control the yaw and the pitch of the camera. For example, the yaw of the camera may be directly affected by the rotation of the first actuator about the first actuator axis. The pitch of the camera may be directly affected by the rotation of the second actuator about the second actuator axis. In some instances, the first and second actuators may not affect the roll of the camera. Alternatively, the first and second actuators may indirectly affect roll of an image captured by the camera. Movement of the first and second actuator in conjunction may or may not affect roll within an image captured by the camera.

The gimbal mechanism as shown in FIG. 1 can be configured to provide rotation of less than or equal to 90° of the payload about the first actuator axis and/or about the second actuator axis. The gimbal mechanism may be configured to provide a rotation of less than or equal to 15°, 30°, 45°, 60°, 75°, 90°, 105°, 120°, 135°, 150°, 165°, or 180° about the first actuator axis and/or about the second actuator axis. In some instances, the gimbal mechanism may be configured to provide a rotation of greater than any of the degree values described. The gimbal mechanism may permit a rotation within a range of degrees falling between any two of the values described.

In the configuration shown in FIG. 1, the first actuator and the second actuator are fixed in spatial position and orientation relative to one another, such that neither the first actuator nor the second actuator is driven by the other. Actuation of the first actuator does not affect a position or orientation of the second actuator or the second coupler. Similarly, actuation of the second actuator does not affect a position or orientation of the first actuator or the first coupler. Therefore, the gimbal mechanism 100 can control the two degrees of freedom in a parallel manner. For instance, the yaw of the payload may be affected without affecting a pitch of the payload, or vice versa. This may occur when the first and second actuators are operating separately or in concert. Optionally, the yaw of the payload may affect a pitch of the payload, or vice versa when the first and second actuators are operating simultaneously. The first actuator 110 and second actuator 150 may be actuated independently, for example via separate electrical connections 145 and 195 that drive each actuator independently. In some instances, a controller may be provided that may generate one or more signals to drive the first actuator and the second actuator. The controller may communicate with the one or more actuators via the electrical connections. The electrical connections may include one or more electrical wires, connectors, printed circuits, or communication lines. The controller may control the first and second actuators independently of one another. The first actuator and the second actuator can thus collectively control the attitude of the payload in parallel, such that the stability in these two degrees of freedom can be improved. In addition, the compact configuration of the first and second actuators can help minimize or reduce the volume of the gimbal mechanism 100.

The gimbal mechanism 100 may further comprise a support structure 200, wherein the first actuator and the second actuator may be coupled to the support structure. The support structure 200 may comprise a fixed configuration, such as the fixed L-shape of the frame shown in FIG. 1. The first actuator 110 can be coupled to the support structure at a first location 205, and the second actuator 150 can be coupled to the support structure at a second location 210 different from the first location. For example, as shown, the first location 205 may be disposed on a first plane and the second location 210 may be disposed on a second plane. The second plane may be substantially orthogonal to the first plane. The second plane may be at any non-parallel angle to the first plane. The first and second actuators may be supported at the first and second locations within an inner surface or region of the support structure. The first and second actuators can be coupled to the support structure directly or indirectly, for example via one or more adapters. The first and second actuators may be fixed in position and orientation relative to the support structure. The first and second actuators may be fixed in position and orientation relative to one another. The first plane and the second plane may be stationary relative to one another.

Figure 2:
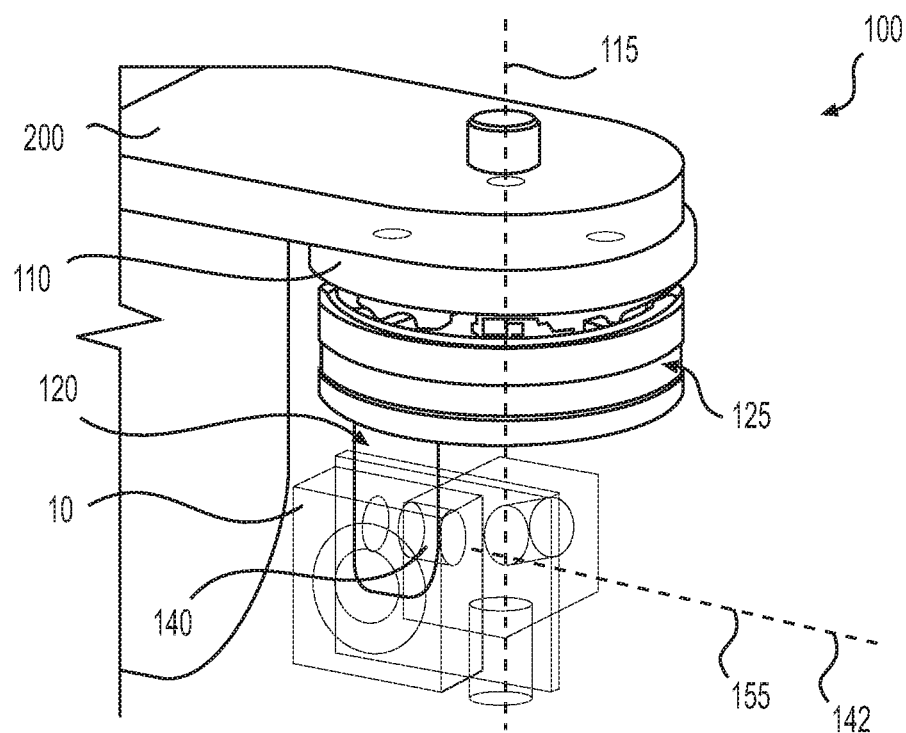
FIG. 2 illustrates the gimbal mechanism of FIG. 1 with one of the actuators removed.

FIG. 2 illustrates the gimbal mechanism 100 of FIG. 1 with the second actuator 150 removed. The first coupler 120 can be configured to allow free rotation of the payload about the second actuator axis 155. The first coupler 120, coupling the payload 10 to the first actuator 110, may comprise a first cantilever member 125 and a first joint member 140.

The first cantilever member 125 may be coupled to the first actuator 110, while the first joint member 140 may be coupled to the payload 10. The first cantilever member may be configured to translate a torque generated by the first actuator to the payload, via the first joint member. The first cantilever member may have a protruding portion with a length extending in a direction parallel to the first actuator axis 115. The protruding portion of the first cantilever may move around the first actuator axis. Optionally, the first actuator axis does not intersect the protruding portion. The first cantilever member may optionally have a rotating base portion. The rotating base portion may rotate about the first actuator axis, which may intersect the rotating base portion. The protruding portion may be connected to the rotating base portion or may be integrally formed with the rotating base portion. The protruding portion may remain stationary relative to the rotating base portion, or may be movable relative to rotating base portion.

The first joint member may be supported by the first cantilever member. The first joint member may connect to the first cantilever member, and may be rotated about a first joint member axis 142 of the first joint member. The first joint member may connect to the protruding portion of the first cantilever member. Rotation of the first cantilever member about the first actuator axis may cause the first joint member to correspondingly rotate about the first actuator axis. The first actuator axis may or may not intersect with the first joint member. A length of the first joint member may be substantially orthogonal to the first actuator axis.

The first joint member can be coupled to the payload such that the payload is free to rotate about the first joint member axis 142. The first joint member may be connected to one or more intermediary structures or adaptors that may be connected to the payload. The payload may rotate relative to the first joint member about the first joint member axis without the first joint member rotating relative to the first cantilever member, the first joint member may rotate relative to the first cantilever member about the first joint member axis without the payload rotating relative to the first joint member, or both rotation of the first joint member relative to the payload and the first cantilever member may be permitted about the first joint member axis. The first joint member may permit rotation of the payload about the first joint member axis. The first joint member may permit rotation of the payload about a second actuator axis. The first joint member axis 142 can be configured to be co-axial with the second actuator axis 155 during actuation of the second actuator, thereby allowing free rotation of the payload about the second actuator axis. When the first actuator is actuated such that the orientation of the first joint member axis changes, the first joint member axis can be configured to remain co-axial with an axis comprising a component of the second actuator axis, such that the payload remains free to rotate about at least a component of the second actuator axis during actuation of the second actuator. The principle of operation of the gimbal mechanism 100 is described in further detail herein with respect to FIGS. 4A, 4B, 4C, 4D, 4E, and 4F.

Figure 3:
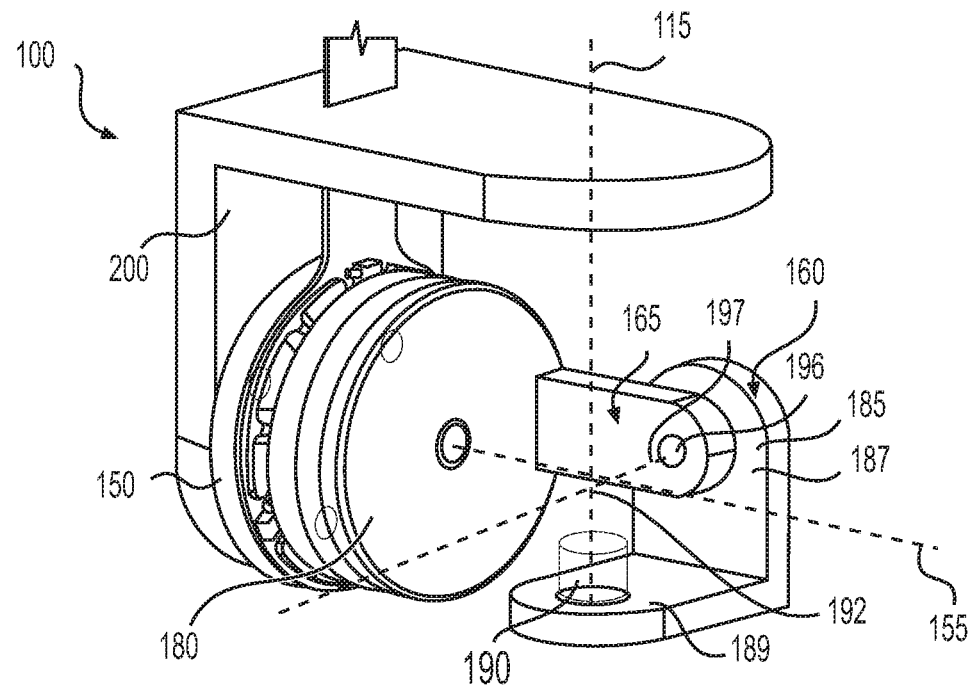
FIG. 3 illustrates the gimbal mechanism of FIG. 1 with another one of the actuators removed.

FIG. 3 illustrates the gimbal mechanism 100 of FIG. 1A with the first actuator 110 removed. The second coupler 160 can be configured to allow free rotation of the payload about the first actuator axis 115. The second coupler 160, coupling the payload 10 to the second actuator 150, may comprise a second cantilever member 165 and a second joint member 190.

The second cantilever member 165 may be coupled to the second actuator 150, while the second joint member may be coupled to the payload. The second cantilever member may be configured to translate a torque generated by the second actuator to the payload, via the second joint member. The second cantilever member 165 may comprise two or more cantilever components, such as first cantilever component 180 and second cantilever component 185. The first cantilever component 180 may extend perpendicularly from the plane of the second actuator 150. The first cantilever component may have a protruding portion with a length extending in a direction parallel to the second actuator axis 155. The protruding portion of the first cantilever component may move around the second actuator axis. Optionally, the second actuator axis does not intersect the protruding portion. The first cantilever component may optionally have a rotating base portion. The rotating base portion may rotate about the second actuator axis, which may intersect the rotating base portion. The protruding portion may be connected to the rotating base portion or may be integrally formed with the rotating base portion. The protruding portion may remain stationary relative to the rotating base portion, or may be movable relative to rotating base portion.

The second cantilever component 185 may comprise an L-shaped member, having a first side 187 coupled to the first cantilever component 180, and a second side 189 coupled to the second joint member 190. The plane of the first side may be parallel to the plane of the protruding portion of the first cantilever component. The first side may be coupled to the protruding portion via a hinge 195. Optionally, the first side may be free to rotate about a hinge axis 197 of the hinge, wherein the hinge axis may be orthogonal to the plane of the first side. The first side may be coupled to the second side at a fixed orientation, such that the first side does not move relative to the second side. For example, the first side may be fixedly coupled to the second side such that the plane of the first side is orthogonal to the plane of the second side. The plane of the second side may be orthogonal to the first actuator axis 115. The plane of the second side may be orthogonal to the second joint member axis 192. The second joint member may be coupled to the second side such that the second joint member is free to rotate about the second joint member axis. The second joint member may be free to rotate about the second joint member axis without affecting rotation of the second side. The second side may be free to rotate about the second joint member axis without affecting rotation of the second joint member. Optionally, the first side and the second side may be connected indirectly via one or more intermediary structures, which may include one or more additional linkages providing additional degrees of freedom.

The second joint member 190 may be supported by the second cantilever component 185 of the second cantilever member 165. Rotation of the second cantilever member about the second actuator axis may cause the second joint member to correspondingly rotate about the second actuator axis. The second actuator axis may or may not intersect with the second joint member. A length of the second joint member may be orthogonal to the second actuator axis.

The second joint member can be coupled to the payload such that the payload is free to rotate about the second joint member axis 192. The second joint member may be connected to one or more intermediary structures or adaptors that may be connected to the payload. The payload may rotate relative to the second joint member about the second joint member axis without the second joint member rotating relative to the second cantilever member, the second joint member may rotate relative to the second cantilever member about the second joint member axis without the payload rotating relative to the second joint member, or both rotation of the second joint member relative to the payload and the second cantilever member may be permitted about the second joint member axis. The second joint member may permit rotation of the payload about the second joint member axis. The second joint member may permit rotation of the payload about a first actuator axis. As shown in FIG. 3, the configuration of the second cantilever member 165 can position the second joint member 190 such that the second joint member axis 192 is co-axial with the first actuator axis 115 during actuation of the first actuator, thereby allowing free rotation of the payload about the first actuator axis.

The second cantilever member 165 can be adjustably configured, in order to allow the payload to rotate freely about the second actuator axis 155 at any orientation of the payload with respect to the first actuator axis 115. For example, two or more cantilever components of the second cantilever member 165 can be movably coupled to one another, such that the two or more cantilever components form a multi-bar linkage. In the exemplary embodiment of FIG. 1C, the first cantilever component 180 and the second cantilever component 185 are joined at a hinge 196 to allow the second cantilever component to rotate freely about a hinge axis 197, thus forming a multi-bar linkage. The multi-bar linkage can allow adjustment of the position and orientation of the second joint member 190 during actuation of the second actuator 150, so as to maintain the second joint member axis 192 orthogonal to the first joint member axis 142. The maintenance of the second joint member axis at an orthogonal orientation with respect to the first joint member axis can allow the payload to rotate freely about the first joint member axis and hence the second actuator axis, even when the first actuator is actuated to so as to offset the alignment between the first joint member axis and the second actuator axis.

While FIGS. 1-3 illustrate the gimbal mechanism 100 having the first coupler 120 and second coupler 160 having particular shapes and disposed in particular spatial positions and orientations, it will be obvious to those skilled in the art that such shapes, spatial positions, and orientations are provided by way of example only. The shape of the first and/or second couplers may be modified in any way, to accommodate a specific shape of the payload so as to avoid interference. In addition, the first or second coupler may comprise any spatial position or orientation that is suitable for translating the torque generated by the actuator coupled thereto, while allowing free rotation of the payload about the axis of rotation of the other actuator.

The payload 10 may be coupled to the first coupler 120 and second coupler 160 directly. For example, the first coupler can be directly coupled to the payload 10 at a first location 12 of the payload via the first joint member 140, and the second coupler can be directly coupled to the payload at a second location 14 of the payload via the second joint member 190. For the camera 20 shown in FIGS. 1-3, the first location 12 can be a location on a lateral side of the camera adjacent the second actuator 150, while the second location 14 can be a location on a bottom side of the camera. The first location and the second location on the payload may be on surfaces that are orthogonal to one another, or non-parallel angles relative to one another. Alternatively, the payload 10 may be coupled to the first coupler and the second coupler indirectly, for example via an adapter 30. The adapter can comprise a gimbal coupling mechanism to couple to the first and second couplers, and a payload coupling mechanism to couple to the payload. For example, the gimbal coupling mechanism can comprise one or more cavities configured to receive one or more of the first joint member 140 at a first location or the second joint member 190 at a second location different from the first location. The payload coupling mechanism can comprise one or more mechanical fasteners configured to fasten the payload onto the adapter, or one or more adhesive surfaces configured to adhere to a surface of the payload. Alternatively or in combination, the payload coupling mechanism can comprise a mounting structure coupled to the adapter, the mounting structure configured to securely couple to the payload, for example via mechanical fasteners, adhesives, or one or more mating connections. Alternatively or in combination, the payload coupling mechanism can comprise an enclosing structure coupled to the adapter, configured to enclose the payload therein so as to securely engage the payload.

As shown in FIG. 1, the payload 10 may comprise a camera 20 having an optical axis 25. The camera may have one or more lens that may focus along the optical axis. The optical axis may be centered on a field of view of the camera. The camera may be coupled to the gimbal mechanism such that the optical axis is adjustable. In some instances, the optical axis may be configured to be orthogonal to both the first actuator axis 115 and the second actuator axis 155. Such an orientation may be a starting point for the camera orientation. In such a configuration, the gimbal mechanism 100 can control the yaw and pitch of the camera 20. Alternatively, the optical axis may be configured to be parallel to the first actuator axis. In such a configuration, the gimbal mechanism 100 can control the roll and pitch of the camera. Alternatively, the optical axis may be configured to be parallel to the second actuator axis. In such a configuration, the gimbal mechanism 100 can control the yaw and roll of the camera. Other orientations of the optical axis of the camera are also possible.

While the gimbal mechanism 100 as illustrated in FIGS. 1-3 is configured to provide two degrees of freedom, the mechanism may be further modified to provide one or more additional degrees of freedom. For example, the gimbal mechanism may comprise a third actuator configured to provide rotation of the payload about a third actuator axis different from the first actuator axis and the second actuator axis. For the embodiment illustrated in FIGS. 1-3, the third actuator axis may, for example, be an axis orthogonal to both the first actuator axis 115 and the second actuator axis 155. The third actuator axis may be parallel to the optical axis 25 of the camera 20, such that the third actuator can control the roll of the camera. In one example, the first and second actuators may control the yaw and pitch of the camera, and the third actuator may control the roll of the camera. Alternatively, the first and second actuators may control the yaw and roll of the camera, and the third actuator may control the pitch of the camera. In another implementation, the first and second actuators may control the pitch and roll of the camera, and the third actuator may control the yaw of the camera. The third actuator can be coupled to the first actuator or the second actuator, such that the third actuator is in series with the first actuator or the second actuator. The payload can be coupled to the third actuator, such that the payload can rotate about the first, second, and third actuator axes.

The direction of the optical axis relative to the first actuator axis and/or the second actuator axis may change over time. In one example, an initial position of the camera may have the optical axis of the camera be orthogonal to the first actuator axis and the second actuator axis. The position of the camera may be changed such that the angle of the optical axis relative to the first actuator axis is changed, and/or the angle of the optical axis relative to the second actuator axis is changed. Using the first actuator to rotate the camera may cause the optical axis to change angle relative to the second actuator axis. Using the second actuator to rotate the camera may cause the optical axis to change angle relative to the first actuator axis. The first and second actuators may be operated sequentially and/or simultaneously. An optional third actuator may be operated sequentially and/or simultaneously with the first and second actuators.

FIGS. 4A, 4B, 4C, 4D, 4E, and 4F illustrate the operation of the gimbal mechanism 100 in multiple stages A-F. The gimbal mechanism is shown coupled to a payload comprising a camera 20. The gimbal mechanism may be used to control the orientation of the payload relative to a support structure about two or more degrees of freedom.

Figure 4A:
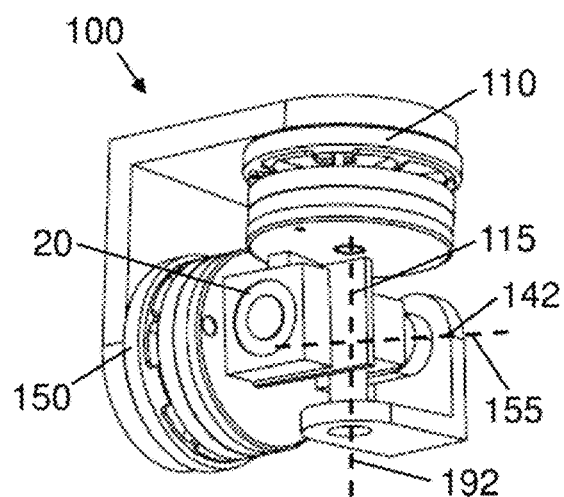
FIGS. 4A, 4B, 4C, 4D, 4E, and 4F illustrate the operation of the gimbal mechanism of FIG. 1 in multiple stages (e.g., stages A-F)

Stage A, as illustrated in FIG. 4A, shows the camera 20 in a default position and orientation, wherein the optical axis of the camera is orthogonal to both the first actuator axis 115 and the second actuator axis 155. The first actuator axis is co-axial with the second joint member axis 192, and the second actuator axis 155 is co-axial with the first joint member axis 142. In some embodiments, the camera may be brought to a default position when the UAV, gimbal mechanism, or camera is powered off. The camera may return to the default position from another position when the UAV, gimbal mechanism, or camera is being powered off. When the UAV, gimbal mechanism, or camera is being powered on, the camera may be at a default position or may immediately assume the default position. In some instances, the camera position may be changed from the default position while the UAV, camera, and/or gimbal mechanism is powered on. The camera position may be changed while the UAV is in flight or while the UAV is in a landed state.

Figure 4B:
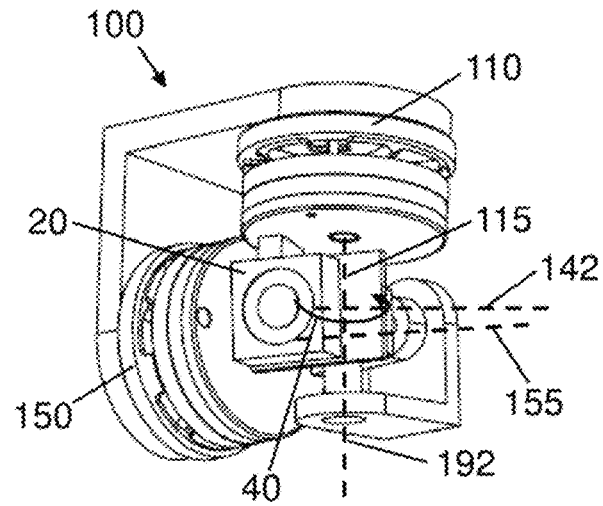

Stage B, as illustrated in FIG. 4B, shows the camera after the first actuator 110 has been actuated, so as to change the orientation of the payload with respect to the first actuator axis 115 (yaw). Specifically, the camera is shown to be panned in the counterclockwise direction, as shown by the arrow 40. As the first actuator is actuated, the payload rotates freely about the second joint member axis 192, which is co-axial with the first actuator axis. The first joint member axis 142, however, is no longer co-axial with the second actuator axis 155, since actuation of the first actuator changes the position of the first joint member 140 and hence the orientation of the first joint member axis.

Figure 4C:
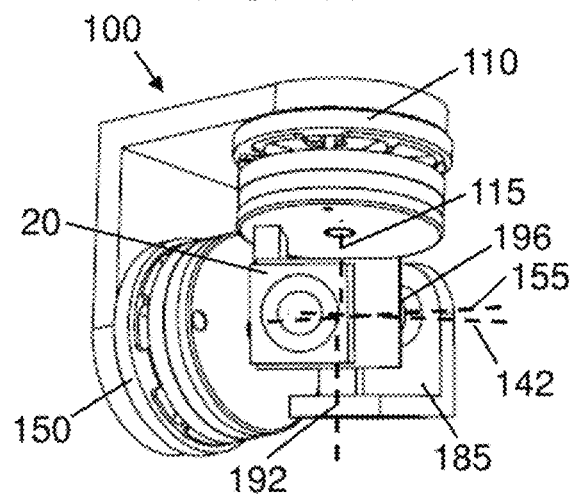

Stage C, as illustrated in FIG. 4C, shows the camera after the first actuator 110 has been further actuated and the second actuator 150 has also been actuated. The payload's orientation with respect to both the first actuator axis 115 (yaw) and the second actuator axis 155 (pitch) has changed; specifically, the camera is shown to be panned further in the counterclockwise direction and pitched downwards. In order to accommodate rotation of the camera about the second actuator axis, when the second actuator is actuated, the position of the second cantilever component 185 is adjusted (e.g., pivoted about the hinge 196) so as to orient the second joint member axis 192 orthogonally to the first joint member axis 142. Such an adjustment of the position of the second cantilever component allows the camera to rotate freely about the first joint member axis in response to the actuation of the second actuator. Thus, the pitch of the camera can be controlled via actuation of the second actuator, wherein the rotation of the camera (about an axis co-axial with the first joint member axis) comprises a component of rotation about the second actuator axis.

Figure 4D:
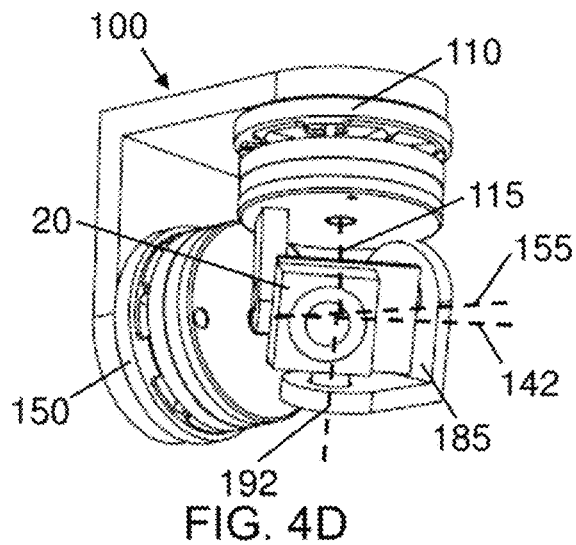
Figure 4E:
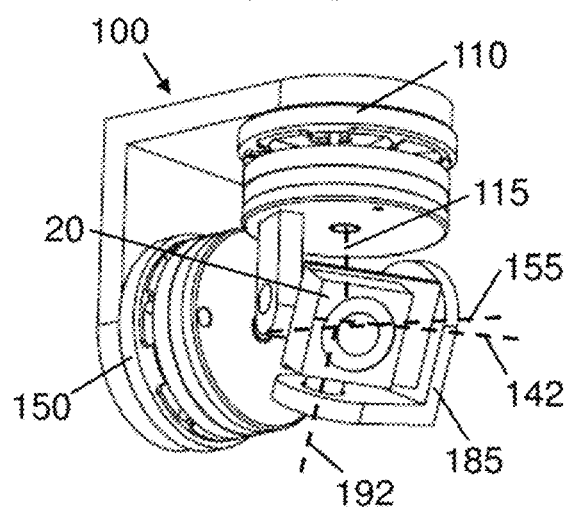

Stages D and E, as illustrated in FIGS. 4D and 4E, respectively, show the camera after both the first actuator 110 and the second actuator 150 have been further actuated, so as to pan the camera further in the counterclockwise direction and pitch the camera further downwards. As the orientation of the camera with respect to the first actuator axis 115 changes further, the position of the second cantilever component 185 adjusts further to maintain the second joint member axis 192 at an orthogonal orientation with respect to the first joint member axis 142.

Figure 4F:
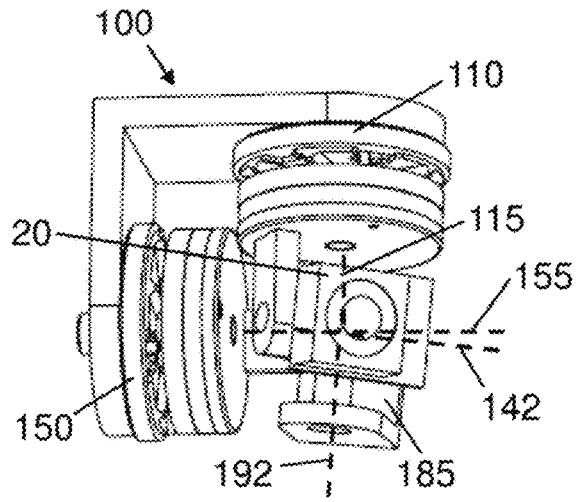

Stage F, as illustrated in FIG. 4F, shows the camera after the second actuator 150 has been actuated to pitch the camera upwards. Again, as the second actuator is actuated, the position of the second cantilever component 185 is automatically adjusted so as to maintain the first and second joint members in proper alignment.

FIGS. 4A, 4B, 4C, 4D, 4E, and 4F show that the gimbal mechanism 100 can control movement of a payload about two degrees of freedom simultaneously. The first and second actuators may be independently controlled to affect the overall movement of the payload about the at least two degrees of freedom. The mechanism's configuration, allowing independent control of the payload's rotation about two degrees of freedom, can provide a compact and stable gimbal mechanism, particularly well-suited for incorporation with an unmanned aerial vehicle.

The gimbal configurations and embodiments described anywhere herein may permit control of a camera about two or more degrees of freedom using a compact gimbal. In some instances, the ratio of the height of the gimbal mechanism relative to the height of the camera may be less than or equal to 3:1, 2:1, 1.5:1, 1.4:1, 1.3:1, 1.2:1, 1.1:1, or 1:1. In some instances, the ratio of the height of the gimbal mechanism to the height of the camera may be greater than any of the values described herein. The ratio of the height of the gimbal mechanism to the height of the camera may fall within a range between any two of the values described herein.

In some instances, the ratio of the length of the gimbal mechanism relative to the length of the camera may be less than or equal to 3:1, 2:1, 1.9:1, 1.8:1, 1.7:1, 1.6:1, 1.5:1, 1.4:1, 1.3:1, 1.2:1, 1.1:1, or 1:1. The ratio of the length of the gimbal mechanism relative to the length of the camera may fall within a range between any two of the values described herein. In some instances, ratio of the length of the gimbal mechanism relative to the length of the camera may be greater than any of the values described herein.

In some instances, the ratio of the volume of the gimbal mechanism relative to the volume of the camera may be less than or equal to 10:1, 7.5:1, 5:1, 2.5:1, or 1:1. The ratio of the volume of the gimbal mechanism relative to the volume of the camera may fall within a range between any two of the values described herein. In some instances, the ratio of the volume of the gimbal mechanism relative to the volume of the camera may be greater than any of the values described herein.

In some instances, the ratio of the weight of the gimbal mechanism relative to the weight of the camera may be less than or equal to 3:1, 2:1, 1.9:1, 1.8:1, 1.7:1, 1.6:1, 1.5:1, 1.4:1, 1.3:1, 1.2:1 or 1:1. The ratio of the weight of the gimbal mechanism relative to the weight of the camera may fall within a range between any two of the values described herein. In some instances, the ratio of the weight of the gimbal mechanism relative to the weight of the camera may be greater than any of the values described herein.

The gimbal mechanism may be of a compact size. In some instances, the height of the gimbal mechanism may be less than or equal to 15 cm, 10 cm, 7 cm, 6 cm, 5 cm, 4.5 cm, 4 cm, 3.5 cm, 3 cm, 2 cm, or 1 cm. In some instances, the height of the gimbal mechanism may be greater than any of the values described herein. The height of the gimbal mechanism may fall within a range between any two of the values described herein.

In some instances, the length of the gimbal mechanism may be less than or equal to 10 cm, 7 cm, 5 cm, 4 cm, 3.5 cm, 3 cm, 2.5 cm, 2 cm, or 1 cm. The length of the gimbal mechanism may fall within a range between any two of the values described herein. In some instances, the length of the gimbal mechanism may be greater than any of the values described herein.

In some instances, the gimbal mechanism may have a volume that is less than or equal to 1000 $cm^3$, 500 $cm^3$, 200 $cm^3$, 100 $cm^3$, 90 $cm^3$, 80 $cm^3$, 70 $cm^3$, 60 $cm^3$, 50 $cm^3$, 40 $cm^3$, 30 $cm^3$, 20 $cm^3$, or 10 $cm^3$. The volume of the gimbal mechanism may fall within a range between any two of the values described herein. In some instances, the volume of the gimbal mechanism may be greater than any of the values described herein.

The gimbal mechanism may be lightweight. In some instances, the gimbal mechanism may have a weight that is less than or equal to 300 g, 200 g, 150 g, 120 g, 110 g, 100 g, 90 g, 80 g, 70 g, 60 g, 40 g, 30 g, 20 g, or 10 g. The weight of the gimbal mechanism may fall within a range between any two of the values described herein. In some instances, the weight of the gimbal mechanism may be greater than any of the values described herein.

The gimbal configurations and embodiments described anywhere herein can have the advantage of having a quicker response time to gimbal positioning, since there can be more than one actuator or motor simultaneously affecting movement of the gimbal. In addition, the gimbal configurations as described herein can support heavier payload, since the compact, parallel mechanism offers higher stiffness and stability compared to a mechanism comprising a plurality of motors mounted in serial.

Figure 5:
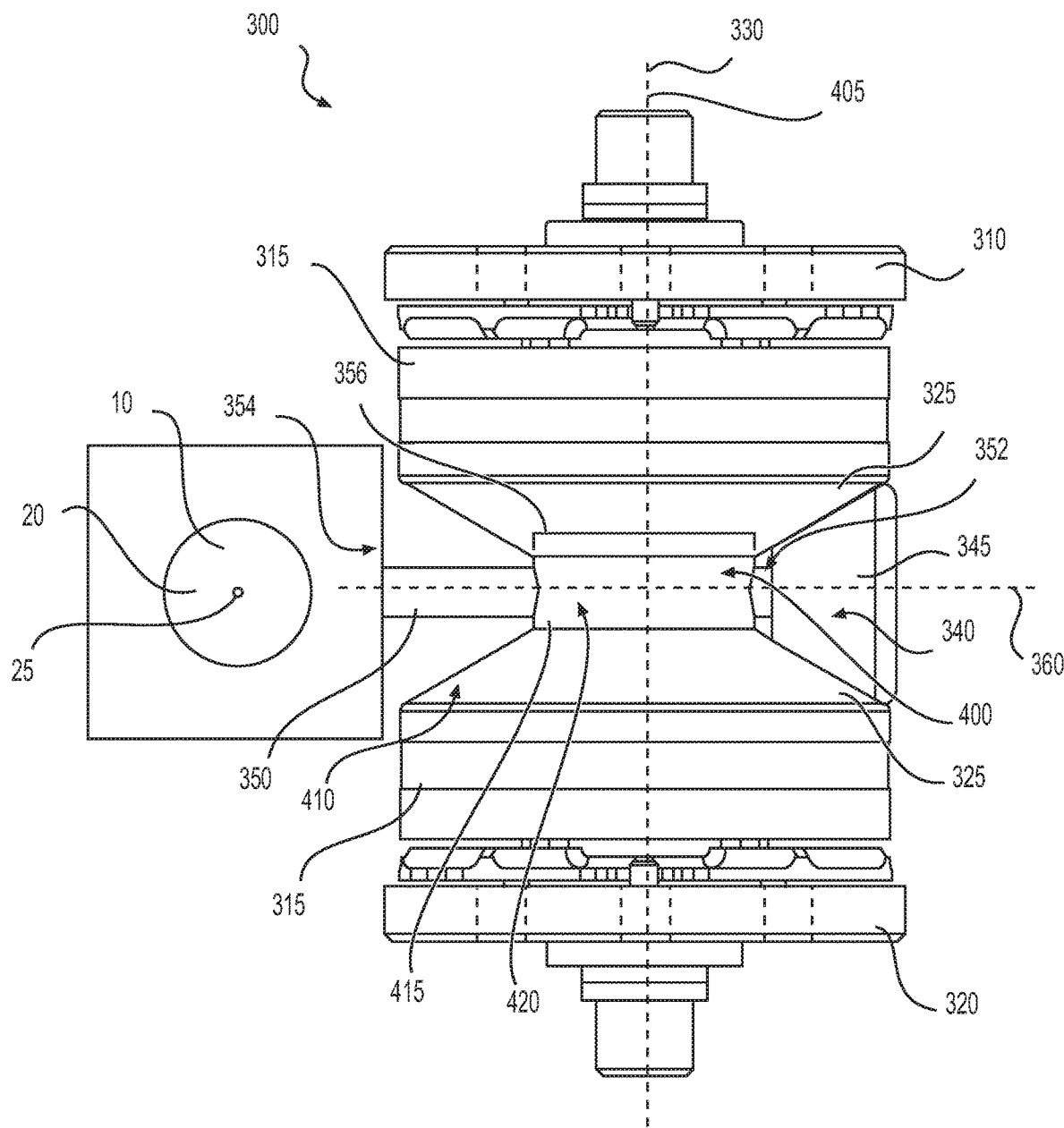
FIG. 5 illustrates another example of a gimbal mechanism for providing movement of a payload about two degrees of freedom, in accordance with embodiments.

FIG. 5 illustrates another example of a gimbal mechanism 300 for providing movement of a payload 10 about two degrees of freedom, in accordance with embodiments. The gimbal mechanism 300 comprises a first actuator 310 configured to provide rotation of the payload about a central actuator axis 330 at a first speed. The gimbal mechanism 300 further comprises a second actuator 320 co-axial with the first actuator, configured to provide rotation of the payload about the central actuator axis at a second speed. The first speed and the second speed may be the same, or may be different. The first actuator and the second actuator may rotate independently of one another. Rotation of the first actuator may optionally not affect the second actuator and vice versa. The first and second actuators may be independently controlled. The direction of rotation of the first and second actuators may be the same, or may be different.

The first actuator may rotate about a first actuator axis. The second actuator may rotate about the second actuator axis. The first and second actuator axes may be parallel to one another. The first and second actuator axes may be the same axis, such as a central axis 330. The first actuator and the second actuators may be coaxial.

The gimbal mechanism 300 further comprises a differential member 360, the differential member comprising a differential gear 345 and a shaft 350. The differential gear can be operatively coupled to the first actuator and the second actuator. The shaft can extend between the first actuator and the second actuator, and comprise an input end 352 coupled to the differential gear and an output end 354 coupled to the payload. The differential member can be configured to provide rotation of the payload about a differential member axis 360 extending along the length of the shaft 350, wherein the shaft can translate the torque generated by the differential member to the payload. The shaft, which is operatively coupled to the first and second actuators via the differential gear, can also translate the torque generated by the first and second actuators to the payload.

Each of the first actuator and the second actuator may comprise a rotor 315 fixedly coupled to an engagement mechanism 325, the engagement mechanism configured to engage or mash with the differential gear so as to couple the movement of the rotor and the differential gear. The engagement mechanism may comprise, for example, an actuator gear or a friction wheel. The engagement mechanism and the differential gear may both be tapered, such that a tapered surface of the engagement mechanism engages a tapered surface of the differential gear.

The gimbal mechanism 300 may further comprise a central frame 400. The first actuator 310, the second actuator 320, and the differential member 340 can be supported with the central frame 400. For example, the first actuator may be coupled to a first end of the central frame, and the second actuator may be coupled to a second end of the central frame opposite the first end. The longitudinal axis 405 of the central frame may be co-axial with the central actuator axis 330. The central frame may comprise a central joint member 410, configured to receive the portion 356 of the shaft 350 that extends between the first actuator and the second actuator. The central joint member can be configured to provide free rotation of the shaft 350, and the payload 10 coupled thereto, about both the central actuator axis 330 and the differential member axis 360. For example, the central joint member may comprise an actuator joint component 415 that is co-axial with and provides free rotation about the central actuator axis, and a differential joint component 420 that is co-axial with and provides free rotation about the differential member axis. In one exemplary configuration, the portion 356 of the shaft can be received within a differential joint component, which is in turn received within the actuator joint component. The actuator joint component and the differential joint component may be orthogonal to each other, as shown.

The differential member axis 360 can be different from the central actuator axis 330. For example, the first actuator axis and the second actuator axis can be positioned at any non-zero angle relative to one another, such as at a 90° angle as shown in FIG. 5. Thus, the payload supported by the gimbal mechanism 300, such as a camera 20, can move about two degrees of freedom, one degree of freedom comprising rotation about the central actuator axis 330 and another degree of freedom comprising rotation about the differential member axis 360. The camera may be coupled to the gimbal mechanism in many orientations. For example, as shown in FIG. 5, the camera may be oriented such that the optical axis 25 of the camera is orthogonal to both the central actuator axis and the differential member axis. In this orientation, the gimbal mechanism can control the yaw of the camera via rotation of the camera about the central actuator axis, and the pitch of the camera via rotation of the camera about the differential member axis. Alternatively, the camera may be coupled to the gimbal mechanism such that that the optical axis of the camera is parallel to the central actuator axis. In this orientation, the gimbal mechanism can control the roll of the camera via rotation of the camera about the central actuator axis, and the pitch of the camera via rotation of the camera about the differential member axis. Alternatively, the camera may be coupled to the gimbal mechanism such that the optical axis of the camera is parallel to the differential member axis. In this orientation, the gimbal mechanism can control the yaw of the camera via rotation of the camera about the central actuator axis, and the roll of the camera via rotation of the camera about the differential member axis.

The payload may be configured to rotate about the central actuator axis, the differential member axis, or both, based on the first actuator speed and the second actuator speed. For example, the angular speed of rotation of the differential member about the differential member axis may be linearly related to the difference between the first actuator speed and the second actuator speed. The payload can be configured to rotate about the central actuator axis without rotating about the differential member axis, if the first actuator speed and the second actuator speed are identical and first actuator and the second actuator are actuated in the same direction about the central actuator axis as viewed from one side of the gimbal mechanism. The payload can be configured to rotate about the differential member axis without rotating about the central actuator axis, if the first actuator speed and the second actuator speed are identical and the first actuator and the second actuator are actuated in opposite directions about the central actuator axis as viewed from one side of the gimbal mechanism. The payload can be configured to rotate about both the central actuator axis and the differential member axis if the first actuator speed and the second actuator speed are different. The relationship between the angular speed of rotation of the payload about the differential member axis and the first and second actuator speeds can be modeled by the following equation:

$$\omega_P = (\omega_1 + \omega_2)/2$$

where $\omega_P$ is the angular velocity of the payload rotating about the differential member axis, $\omega_1$ is the angular velocity of the first actuator, and $\omega_2$ is the angular velocity of the second actuator. Similarly, the relationship between the angular speed of rotation of the payload about the central actuator axis can be modeled by the following equation:

$$\omega_Y = (|\omega_1 - \omega_2|/2) \ast (D/d)$$

where $\omega_Y$ is the angular velocity of the payload rotating about the central actuator axis, $\omega_1$ is the angular velocity of the first actuator, $\omega_2$ is the angular velocity of the second actuator, D is the diameter (or number of teeth) of the rotors coupled to the actuators, and d is the diameter (or number of teeth) of the differential member, such that (D/d) represents the transmission ratio.

As shown in FIG. 5, the first actuator and the second actuator may be fixed in position and orientation relative to one another, such that neither the first actuator nor the second actuator is driven by the other. In such a configuration, actuation of the first actuator does not affect a position or orientation of the second actuator, and actuation of the second actuator does not affect a position or orientation of the first actuator. The first actuator and the second actuator may be actuated independently, for example via separate electrical connections. Accordingly, the first actuator speed and the second actuator speed can be independent of one another, wherein the difference between the two speeds can drive movement of the payload about the differential member axis. The first actuator and the second actuator can thus collectively control the attitude of the payload in parallel, such that the stability in the two degrees of freedom can be improved.

The components of the gimbal mechanism 300 can be configured so as to have a compact configuration, thereby minimizing the volume and improving the stability of the gimbal mechanism. For example, as shown in FIG. 5, the shaft 350 can be configured to extend between the first actuator 310 and second actuator 320 so as to traverse the central actuator axis 330. In such a configuration, the differential gear 345 is disposed on one side of the central actuator axis, while the payload is disposed on the opposite side across the central actuator axis. In this configuration, rotational movement of the payload 10 about both central actuator axis 330 and the differential member axis 360 is accommodated by the central joint member 410, configured to receive the portion 356 of the shaft extending between the first and second actuators. Such a configuration can provide a more compact gimbal mechanism with a smaller volume, compared to a configuration in which the differential gear and the payload are both disposed on the same side of the central actuator axis, such that the shaft does not extend between the first and second actuators. Further, such a configuration can improve the stability of the movement of the payload about both the central actuator axis and the differential member axis 360. Volume minimization and stability improvement can be advantageous for uses of the gimbal mechanism with aerial vehicles.

As shown in FIG. 5, the gimbal mechanism 300 can provide a full rotation of the payload 10 about the central actuator axis 330 and/or about the differential member axis 360. For example, the gimbal mechanism may be able to provide at least 360° rotation of the payload about the central actuator axis and the differential member axis. The gimbal mechanism can be configured to provide an unlimited number of full rotations about the central actuator axis and/or the differential member axis. The gimbal mechanism may be configured to provide rotation in either or both directions about the central actuator axis. The gimbal mechanism may be configured to provide rotation in either or both directions about the differential member axis. To support full rotation of the payload about both axes, components of the gimbal mechanism 300, such as the first actuator, the second actuator, the differential member, and the central frame may be configured such that no component obstructs full rotational movement of the payload about either axis. The ability to provide full rotations about two different axes can be particularly advantageous for applications of the gimbal mechanism in aerial photography, wherein the gimbal is coupled to an aerial vehicle and the payload supported by the gimbal comprises a camera for aerial photography.

The payload 10 may be coupled to the shaft 350 directly, for example via mechanical fasteners, adhesives, or one or more mating connections. Alternatively, the payload may be coupled to the shaft indirectly, for example via an adapter. The adapter can comprise one or more mechanical fasteners configured to fasten the payload onto the adapter, or one or more adhesive surfaces configured to adhere to a surface of the payload. Alternatively or in combination, the adapter can comprise a mounting structure coupled to the adapter, the mounting structure configured to securely couple to the payload, for example via mechanical fasteners, adhesives, or one or more mating connections. Alternatively or in combination, the adapter can comprise an enclosing structure coupled to the adapter, configured to enclose the payload therein so as to securely engage the payload.

As shown in FIG. 5, the payload 10 may comprise a camera 20 having an optical axis 25. The camera may be coupled to the gimbal mechanism such that the optical axis is adjustable. The optical axis may be configured to be orthogonal to both the central actuator axis 330 and the differential member axis 360, as shown. In such a configuration, the gimbal mechanism 300 can control the yaw and pitch of the camera 20. Alternatively, the optical axis 25 may be configured to be parallel to the central actuator axis or to the differential member axis, such that the gimbal mechanism can control the roll and yaw or the roll and pitch of the camera. Other orientations of the optical axis of the camera are also possible.

While the gimbal mechanism 300 as illustrated in FIG. 5 is configured to provide two degrees of freedom, the mechanism may be further modified to provide one or more additional degrees of freedom. For example, the gimbal mechanism may comprise a third actuator configured to provide rotation of the payload about a third actuator axis different from the central actuator axis 330 and the differential member axis 360. For the embodiment illustrated in FIG. 5, the third actuator axis may, for example, be an axis orthogonal to both the central actuator axis and the differential member axis and parallel to the optical axis 25 of the camera 20, such that the third actuator can control the roll of the camera. The third actuator can be coupled to the output end 354 of the shaft 350, such that the third actuator is in series with the first and second actuators and the differential gear. The payload can be coupled to the third actuator, such that the payload can rotate about the central actuator axis, the differential member axis, and the third actuator axis.

For all embodiments of the gimbal mechanisms described herein, an actuator may comprise an automatic or machine-driven component such as an electric motor. Alternatively or in combination, an actuator may comprise a manually-manipulated component such as a lever, a handle, a knob, or a tilting mechanism.

Figure 6:
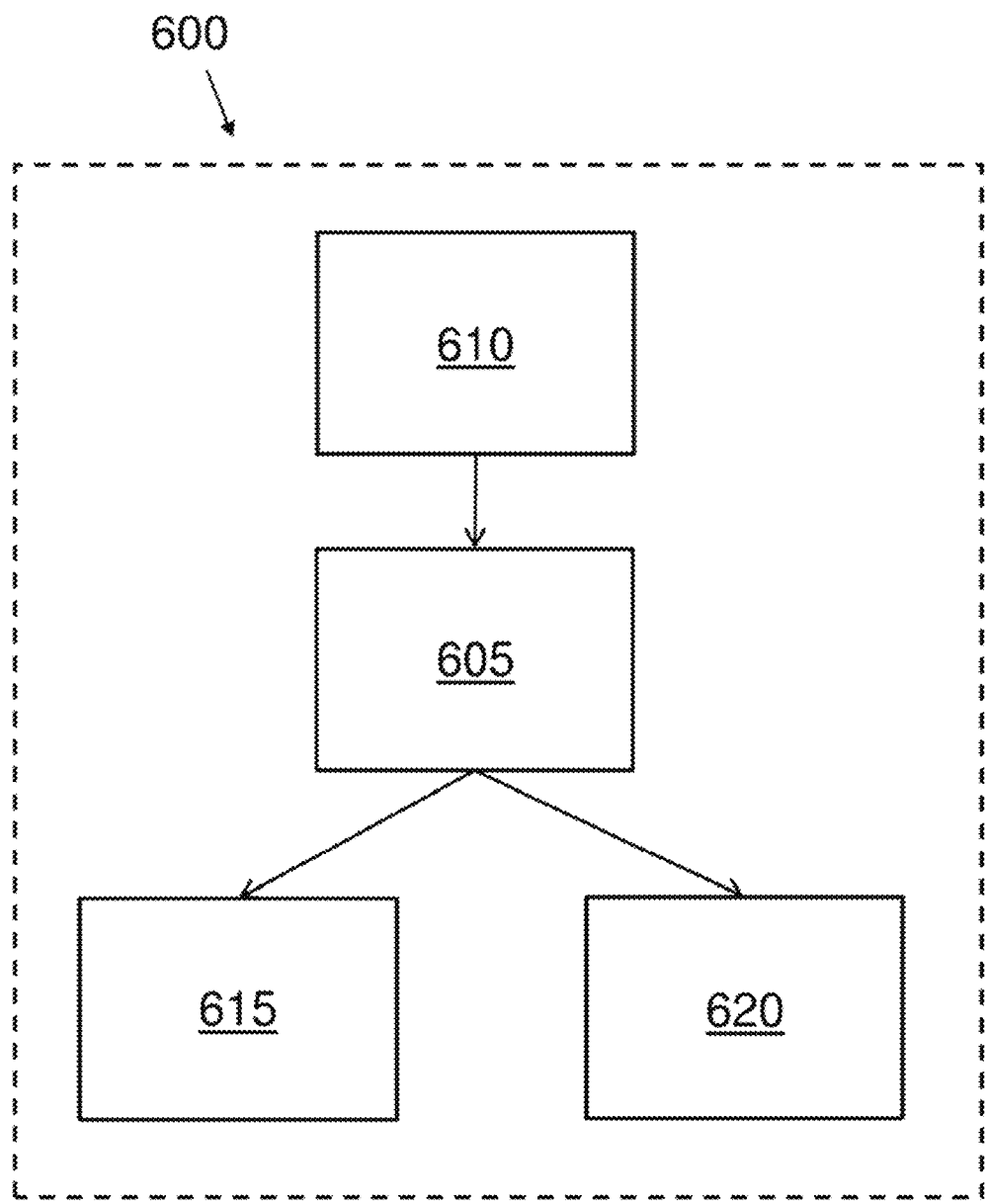
FIG. 6 is a schematic illustration by way of block diagram of a system 600 for controlling a gimbal mechanism, in accordance with embodiments.

FIG. 6 is a schematic illustration by way of block diagram of a system 600 for controlling a gimbal mechanism, in accordance with embodiments. A gimbal mechanism as described herein may be automatically controlled via a controller 605, configured to generate signals to control actuation of one or more actuators of the gimbal mechanism. The controller may be disposed in any location from which the controller can be operatively coupled to the gimbal mechanism. For example, the controller may be coupled to a portion of a UAV carrying the gimbal mechanism and a payload. The controller may be coupled to a portion of the gimbal mechanism, such as a portion of a support structure as described herein. The controller may receive input signals from an input system 610, wherein the input signals may comprise instructions to change the position or orientation of a payload coupled to the gimbal mechanism, or instructions to actuate one or more actuators. The input system may comprise a user input system through which a user may directly provide instructions to control actuation of the gimbal mechanism. Alternatively or in combination, the input system may comprise a computer-controlled input system such as an auto-pilot system. Depending on the nature of the input signals provided to the controller, the controller may provide one or more operations to generate control signals to be transmitted to the one or more actuators. For example, if the input signals comprise instructions to change the orientation of the payload in a specific direction, the controller may be configured to calculate the degree of actuation of each actuator of the gimbal mechanism required to collectively achieve the desired change in orientation of the payload. The output of the controller may comprise instructions to each of the one or more actuators to actuate in a specific direction and by a specific degree. For example, if the gimbal mechanism comprises a first actuator 615 and a second actuator 620, the controller may generate separate control signals for the first actuator, and separate control signals for the second actuator. The control signals may be transmitted to each actuator via a separate connection, such as a first electrical connection 145 to the first actuator, and a second electrical connection 195 to the second actuator, as shown in FIG. 1. The controller can thus control the actuation of each actuator independently, such that the actuation of each actuator is independent of the actuation of other actuators in the system.

The gimbal mechanisms as described herein may be coupled to an aerial vehicle such as an unmanned aerial vehicle (UAV), to provide movement of a payload coupled to the aerial vehicle. A gimbal mechanism can be coupled to the aerial vehicle via a support structure (e.g., support structure 200, central frame 400), wherein the support structure supports components of the gimbal mechanism such as a first actuator, a second actuator, a first coupler, a second coupler, and/or an adapter. The payload may be coupled to the gimbal mechanism as described herein, so as to couple the payload to the support structure and to the aerial vehicle.

The gimbal mechanism as described herein may be coupled to a UAV in many ways. The gimbal mechanism may be fastened directly to a portion of the UAV body. The gimbal mechanism may be fastened indirectly to a portion of the UAV via one or more intermediary structures. For example, the gimbal mechanism may be fastened to the UAV via an isolator, configured to reduce vibration transmitted from the UAV to the gimbal mechanism.

The gimbal mechanism as described herein may be coupled, either directly or indirectly such as via an isolator, to a UAV at one of many locations. For example, the gimbal mechanism may be coupled to a top surface of the UAV, a bottom surface of the UAV, a front surface of the UAV, or a side surface of the UAV. The gimbal mechanism may be coupled centrally with respect to the UAV, such that the center of weight of the gimbal mechanism is aligned with a central axis of the body of the UAV. For example, the gimbal mechanism may be coupled to a top or bottom surface of the UAV such that the gimbal mechanism is disposed at a central junction of the arms of the UAV. The gimbal mechanism may be coupled to a bottom surface of the UAV such that the gimbal mechanism is disposed in a region between the landing stands of the UAV.

Figure 7:
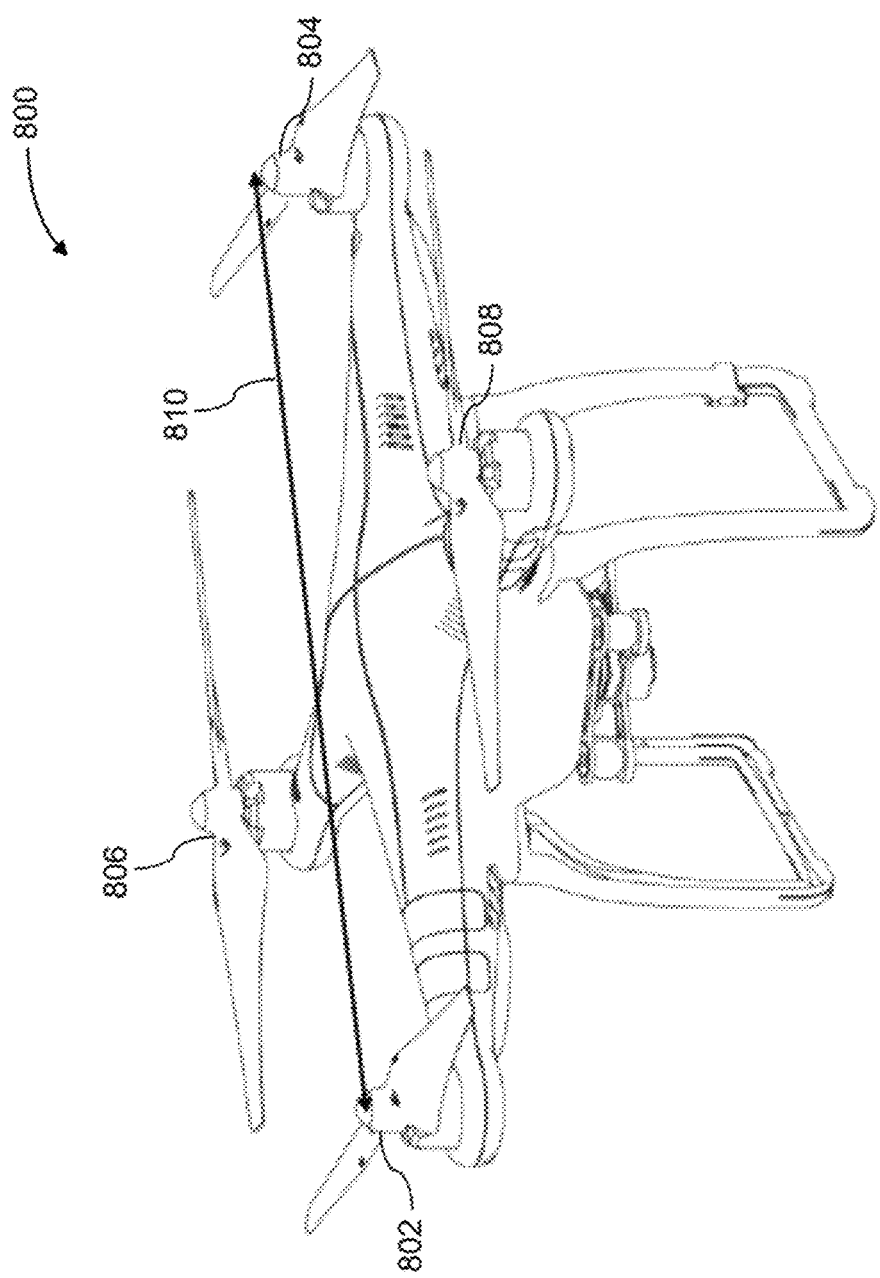
FIG. 7 illustrates an unmanned aerial vehicle, in accordance with embodiments.

FIG. 7 illustrates an unmanned aerial vehicle (UAV) 800, in accordance with embodiments of the present invention. The UAV may be an example of a movable object as described herein. The UAV 800 can include a propulsion system having four rotors 802, 804, 806, and 808. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 810. For example, the length 810 can be less than or equal to 2 m, or less than equal to 5 m. In some embodiments, the length 810 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 8:
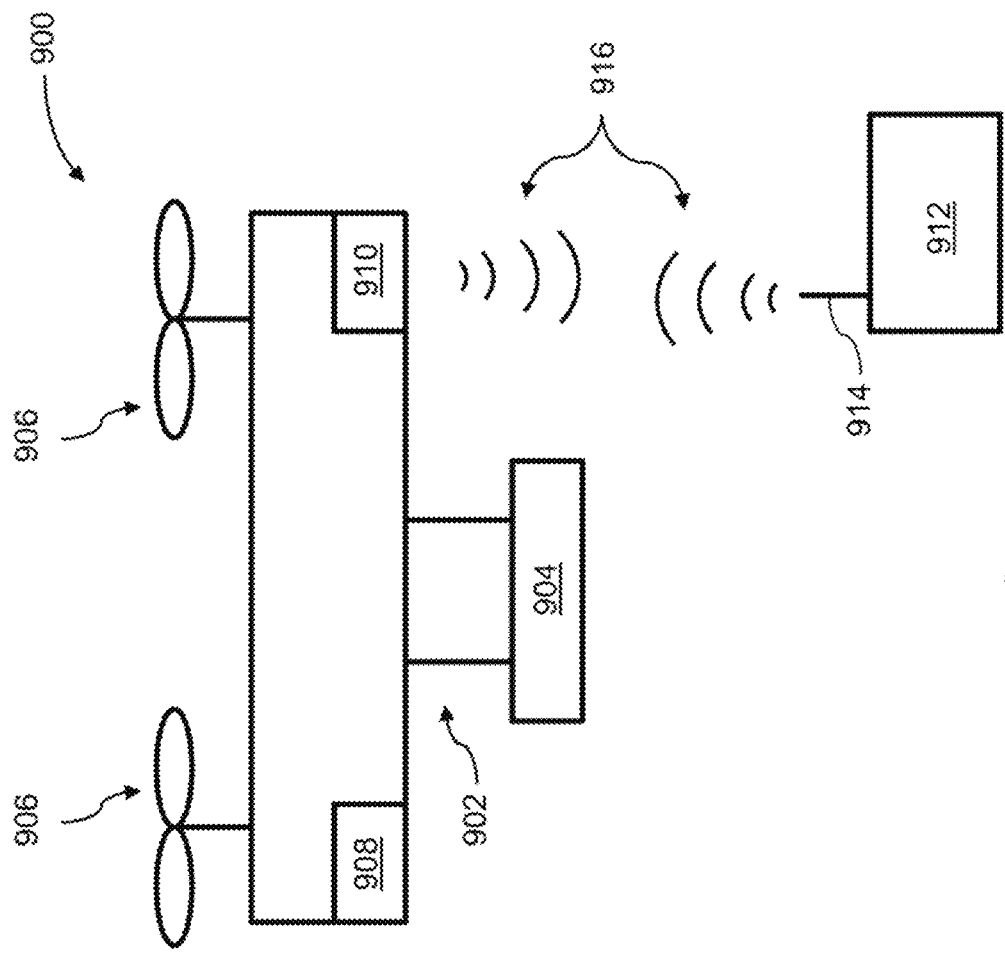
FIG. 8 illustrates a movable object, in accordance with embodiments.

FIG. 8 illustrates a movable object 900 including a carrier 902 and a payload 904, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some instances, the payload 904 may be provided on the movable object 900 without requiring the carrier 902. The movable object 900 may include propulsion mechanisms 906, a sensing system 908, and a communication system 910. The propulsion mechanisms 906 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation.

For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 908 can include one or more sensors that may sense the spatial disposition, velocity, and/or acceleration of the movable object 900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 910 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

FIG. 9 is a schematic illustration by way of block diagram of a system 1000 for controlling an movable object, in accordance with embodiments. The system 1000 can be used in combination with any suitable embodiment of the systems, devices, and methods disclosed herein. The system 1000 can include a sensing module 1002, processing unit 1004, non-transitory computer readable medium 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors. In some embodiments, the sensing module can be operatively coupled to a transmission module 1012 (e.g., a Wi-Fi image transmission module) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication, as described in further detail below. The communication module 1010 can transmit and/or receive one or more of sensing data from the sensing module 1002, processing results produced by the processing unit 1004, predetermined control data, user commands from a terminal or remote controller, and the like. In some embodiments, the communication module 1010 can be configured to implement adaptive communication mode switching, as described elsewhere herein.

The components of the system 1000 can be arranged in any suitable configuration. For example, one or more of the components of the system 1000 can be located on the movable object, carrier, payload, terminal, sensing system, or an additional external device in communication with one or more of the above. Additionally, although FIG. 10 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A gimbal mechanism for providing movement of a payload about at least two degrees of freedom, the gimbal mechanism comprising:
   a first actuator providing rotation about a first actuator axis;
   a second actuator providing rotation about a second actuator axis different from the first actuator axis;
   a first coupler operatively coupling the first actuator and the payload, the first coupler being configured to affect rotation of the payload about the first actuator axis; and
   a second coupler operatively coupling the second actuator and the payload, the second coupler being configured to affect rotation of the payload about the second actuator axis and comprising:
      a joint member configured to be coupled to the payload; and
      a cantilever member coupled to the second actuator and configured to translate a torque generated by the second actuator to the payload via the joint member, the cantilever member comprising a first cantilever component and a second cantilever component movably coupled to each other via a hinge, and the hinge being configured to provide free rotation of the second cantilever component about a hinge axis;
   wherein the first actuator and the second actuator are fixed in position and orientation relative to one another and relative to a support structure, the support structure being configured to support at least one of the first actuator or the second actuator.

2. The gimbal mechanism of claim 1, wherein the gimbal mechanism is configured to:
   provide rotation of less than or equal to 90 degrees of the payload about the first actuator axis; and
   provide rotation of less than or equal to 90 degrees of the payload about the second actuator axis.

3. The gimbal mechanism of claim 1, wherein:
   the joint member is a second joint member and the cantilever member is a second cantilever member; and
   the first coupler comprises:
      a first joint member coupled to the payload; and
      a first cantilever member coupled to the first actuator and configured to translate a torque generated by the first actuator to the payload via the first joint member.

4. The gimbal mechanism of claim 3, wherein:
   the first joint member comprises a first joint member axis configured to provide free rotation of the payload about the second actuator axis; and
   the second joint member comprises a second joint member axis configured to provide free rotation of the payload about the first actuator axis.

5. The gimbal mechanism of claim 4, wherein the first joint member axis and the second joint member axis are configured to remain orthogonal to each other during actuation of the first actuator or the second actuator, such that the payload is free to rotate about both the first actuator axis and the second actuator axis.

6. The gimbal mechanism of claim 5, wherein, during actuation of the first actuator, the second joint member axis is configured to be co-axial with the first actuator axis, thereby allowing free rotation of the payload about the first actuator axis.

7. The gimbal mechanism of claim 5, wherein, during actuation of the second actuator, the first joint member axis is configured to be co-axial with the second actuator axis or with an axis comprising a component of the second actuator axis, thereby allowing free rotation of the payload about the second actuator axis.

8. The gimbal mechanism of claim 1, wherein the first cantilever component and the second cantilever component are configured to allow adjustment of the orientation of the second joint member during actuation of the first actuator or the second actuator.

9. The gimbal mechanism of claim 1, further comprising:
   the support structure;
   wherein the first actuator and the second actuator are coupled to the support structure.

10. The gimbal mechanism of claim 9, wherein the first actuator is coupled to the support structure at a first location, and the second actuator is coupled to the support structure at a second location different from the first location.

11. The gimbal mechanism of claim 10, wherein the first location is disposed on a first plane, and the second location is disposed on a second plane orthogonal to the first plane.

12. The gimbal mechanism of claim 1, wherein the first actuator axis and the second actuator axis are positioned at a non-zero angle relative to one another.

13. The gimbal mechanism of claim 1, wherein the payload is a camera.

14. The gimbal mechanism of claim 1, further comprising:
   a third actuator providing rotation about a third actuator axis, the third actuator axis being different from the first actuator axis and the second actuator axis.

15. The gimbal mechanism of claim 14, wherein the third actuator is coupled to the first actuator or the second actuator.

16. The gimbal mechanism of claim 14, wherein the third actuator axis is orthogonal to both the first actuator axis and the second actuator axis.

17. The gimbal mechanism of claim 14, wherein the payload is coupled to the third actuator.

18. The gimbal mechanism of claim 1, wherein the gimbal mechanism is coupled to an unmanned aerial vehicle.

19. The gimbal mechanism of claim 18, wherein the gimbal mechanism is coupled to the unmanned aerial vehicle via the support structure supporting the first actuator, the second actuator, the first coupler, the second coupler, and the payload.

* * * * *